May 3, 1932. O. GERLINE 1,856,477
FISHING ROD HOLDER
Filed Oct. 3, 1931
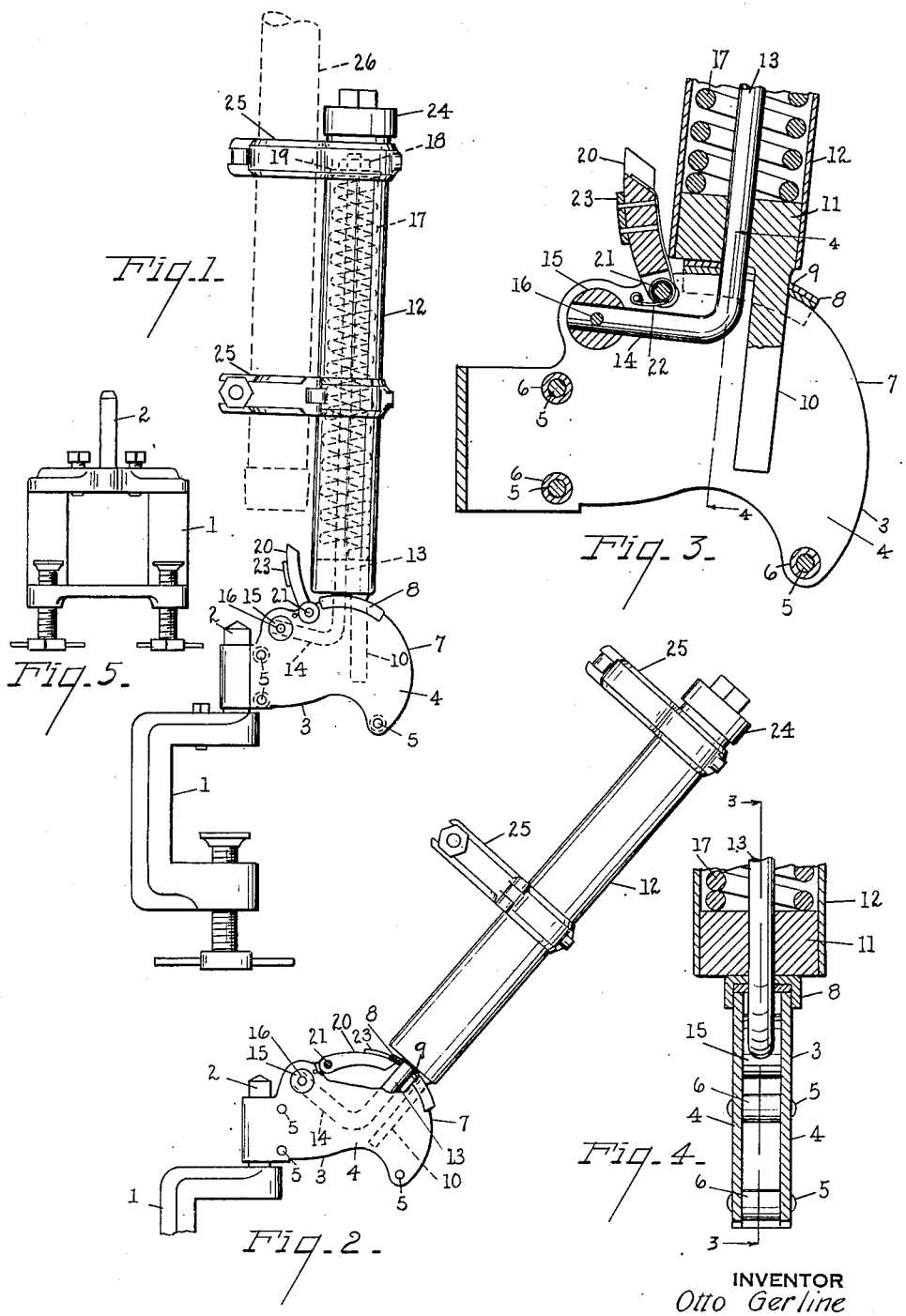
INVENTOR
Otto Gerline
BY
Chappell & Earl
ATTORNEYS Patented May 3, 1932

1,856,477

UNITED STATES PATENT OFFICE

OTTO GERLINE, OF KALAMAZOO, MICHIGAN

FISHING ROD HOLDER

Application filed October 3, 1931. Serial No. 566,618.

The main object of my invention is to provide an improved fishing rod holder which is particularly desirable and useful in connection with deep sea fishing.

Another object of the invention is to provide a device of this character having means associated for assisting the operator in trolling for fish and in manipulating the rod after a fish has been hooked.

A still further object is to provide a device of this character which will assist in hooking a fish.

Another object is to provide a holder which will prevent the fishing rod from turning while reeling in a fish.

Objects relating to details and economies of my invention will appear from the description to follow. The invention is defined and pointed out in the claims.

A structure which is a preferred embodiment of my invention is illustrated in the accompanying drawings, in which:

Fig. 1 is a side elevational view of a fishing rod holder embodying the desirable features of my invention.

Fig. 2 is a similar view showing the device locked in trolling position.

Fig. 3 is an enlarged fragmentary vertical section taken on line 3—3 of Fig. 4.

Fig. 4 is a transverse section taken on line 4—4 of Fig. 3.

Fig. 5 is a front elevation of the clamp.

Referring to the drawings, numeral 1 designates the clamp which is adapted to be secured to a seat of a boat, an angler's chair, or any other supporting member. The clamp 1 is provided with a non-circular vertical post or stud 2 which carries the support 3, the latter being of substantially channel shape and receiving the post 2 at the base of the opening between the flanges 4. The flanges 4 are held in fixed spaced relationship by the rivets 5 and spacing members 6 which are short tubes. The outer surfaces of the flanges 4 are shaped so as to provide spaced segmental cam surfaces 7 which extend through an arc of about 90° from the vertical.

Coacting with the cam surfaces 4 is a cam follower or slide 8 of substantially U-shape, the flanges thereof extending over the sides of the support 3, as illustrated by Fig. 4. The slide 8 is provided with a central opening or slot 9 for the accommodation of guide pin 10 which depends from the plug 11 disposed within the lower end of the tubular rod holder 12. The guide pin 10 coacts with the flanges 7 to maintain the arcuate movement of the rod holder 12 in a substantially vertical plane. The rod holder 12 is provided with a connecting rod 13 which extends through openings provided therefor in the plug 11 and slide 9 and terminates in an offset end 14 which is connected to the pivot 15 by pin 16. The pivot 15 is journaled to the side members or flanges 7 of the support 3 so that the connecting rod 13 is free to turn the pivot 15.

A compression spring 17 is disposed within the holder 12 and is connected at its upper end by a nut 18 and thrust collar 19 to the inner end of the connecting rod 13. The lower end of the spring 17 bears against the closure plug 11. The arrangement is such that the spring 17 tends to urge the holder 12 to vertical position at all times.

A dog 20 is pivoted between the flanges 4 at 21 and is provided with a spring 22 for urging it upwardly about its pivot 21. The dog 20 carries a stop 23 which overhangs the flanges and limits the inward movement of the dog 20. The holder 12 is set, as illustrated by Fig. 2, by swinging it forwardly about 45° from the vertical and then depressing the dog 20 until the stop 23 engages the slide 8. The dog 20 locks the slide 8 in this position.

The holder 12 is provided with a removable cap 24 and with spaced clamps 25 which are adapted to engage and support a fishing rod as 26, as illustrated by dotted lines in Fig. 1. The device is locked, as illustrated by Fig. 2, so that when a fish strikes, the holder 12 will be pulled downwardly, thereby permitting the dog 20 under the influence of the spring 22 to swing upwardly out of the path of the slide 8, fully releasing the latter. Thereafter, the angler may manipulate the fishing rod 26 back and forth assisted by the spring 17. It is to be noted that after the strike has released the dog 20, the spring 17 throws the pole 26 upwardly to more effectively engage or hook the fish. The spring 17 also automatically maintains a tight line and at the same time permits the pole or fishing rod 26 to swing downwardly under sudden jerks. The non-circular post 2 and the non-circular opening between the flanges 4 prevent the fishing rod 26 from swinging sidewise while the reel (not shown) associated therewith is being operated.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent, is:

1. In a device of the class described, the combination with a clamp provided with an upright non-circular post, of a channel-shaped support removably engaged with said post, said support having a segmental cam surface, a tubular fishing rod holder having a plug at its inner end provided with an arm extending between the flanges of said support and provided with a U-shaped slide embracing said support, a connecting rod having an offset arm at its inner end pivoted to said support and disposed through said plug in said holder, a coiled spring disposed in said holder with its inner end supported by said plug, said rod being provided with a thrust collar with which the outer end of said spring is engaged, and a locking dog for said slide pivoted to said support and provided with a spring acting to urge it to inoperative position.

2. In a device of the class described, the combination with a clamp provided with an upright non-circular post, of a channel-shaped support removably engaged with said post, said support having a segmental cam surface, a fishing rod holder provided with an arm extending between the flanges of said support and provided with a U-shaped slide embracing said support, a connecting rod pivoted to said support, a coiled spring disposed in said holder to act on said rod, and a locking dog for said slide pivoted to said support and provided with a spring acting to urge it to inoperative position.

3. In a device of the character described, the combination with a non-circular post provided with means for attachment to a seat or the like, of a support having a non-circular opening detachably egageable with said post and provided with a cam surface, a connecting rod pivoted to said support, a fishing rod holder slidably mounted on said connecting rod and provided with means to receive a fishing rod, a slide carried by said holder coacting with said cam surface, a guide pin carried by said holder coacting with said support for laterally supporting the holder, a spring disposed in said holder to act on said rod whereby said holder is urged to upright position by the coaction of said slide with said cam surface, and a locking dog for holding said holder in a forward position, said dog being provided with a spring acting to urge said dog out of the path of said holder.

4. In a device of the character described, the combination with a non-circular post provided with means for attachment to a seat or the like, of a support having a non-circular opening detachably engageable with said post and provided with a cam surface, a connecting rod pivoted to said support, a fishing rod holder slidably mounted on said connecting rod and provided with means to receive a fishing rod, a slide carried by said holder coacting with said cam surface, a spring disposed in said holder to act on said rod whereby said holder is urged to upright position by the coaction of said slide with said cam surface, and a locking dog for holding said holder in a forward position, said dog being provided with a spring acting to urge said dog out of the path of said holder.

5. In a device of the character described, the combination of a support, a holder pivotally mounted on said support, spring means acting to urge said holder to an upright position, a manually engageable dog for holding said holder in a forwardly inclined position, and a spring acting to automatically release and urge said dog out of the path of said holder upon the forward movement of the holder from its locked position.

6. In a device of the character described, the combination with a clamp and a fishing rod, of means pivotally connecting said rod to said clamp, whereby said rod is free to swing only through an arc of approximately 90° from the vertical, resilient means urging said rod to upright position, means for locking said rod against the force of said resilient means at an angle of approximately 45°, and resilient means urging said locking means out of said locking position, whereby, when said rod is swung beyond said 45° removed position, said locking means releases said rod.

7. In a device of the character described, the combination with a clamp and a fishing rod, of means pivotally connecting said rod to said clamp, whereby said rod is free to swing only through an arc from the vertical, resilient means urging said rod to upright position, means for locking said rod against the force of said resilient means, and resilient means urging said locking means out of said locking position, whereby, when said rod is swung beyond said removed position, said locking means releases said rod.

8. In a device of the character described, the combination with a clamp and a fishing rod, of means pivotally connecting said rod to said clamp, whereby said rod is free to swing only in a single vertical plane and through a limited arc, resilient means urging said rod to one of the limits of said arc, releasable means for locking said rod against the force of said resilient means in a position between the limits of said arc, and resilient means urging said locking means out of locking position, whereby, when said rod is swung further away from said one limit, said locking means releases said rod.

9. In a device of the character described, the combination with a clamp and a fishing rod, of means connecting said rod to said clamp, whereby said rod is free to swing only in a single plane and through a limited arc, said means including a casing, resilient means disposed in said casing and urging said rod to one of the limits of said arc, and spring retracted releasable means for locking said rod against the force of said resilient means in a position between the limits of said arc, whereby, when said rod is swung further away from said one limit, said locking means is retracted and releases said rod, which may then be pumped through said arc.

10. A fishing rod holder provided with a support, a casing pivoted to said support, a spring in said casing urging said casing to an initial angular position relative to said support, and a spring retracted latch for locking said casing against the force of said spring in a predetermined angular position spaced from said initial position, whereby when said casing is latched and swung further away from its initial position, it is released by the retraction of said latch, leaving the casing free to be pumped on said support without interference from the latch.

In witness whereof I have hereunto set my hand.

OTTO GERLINE.